T. KOPINSKI.
HARROW.
APPLICATION FILED JULY 9, 1912.
1,058,067.
Patented Apr. 8, 1913.
2 SHEETS—SHEET 1.
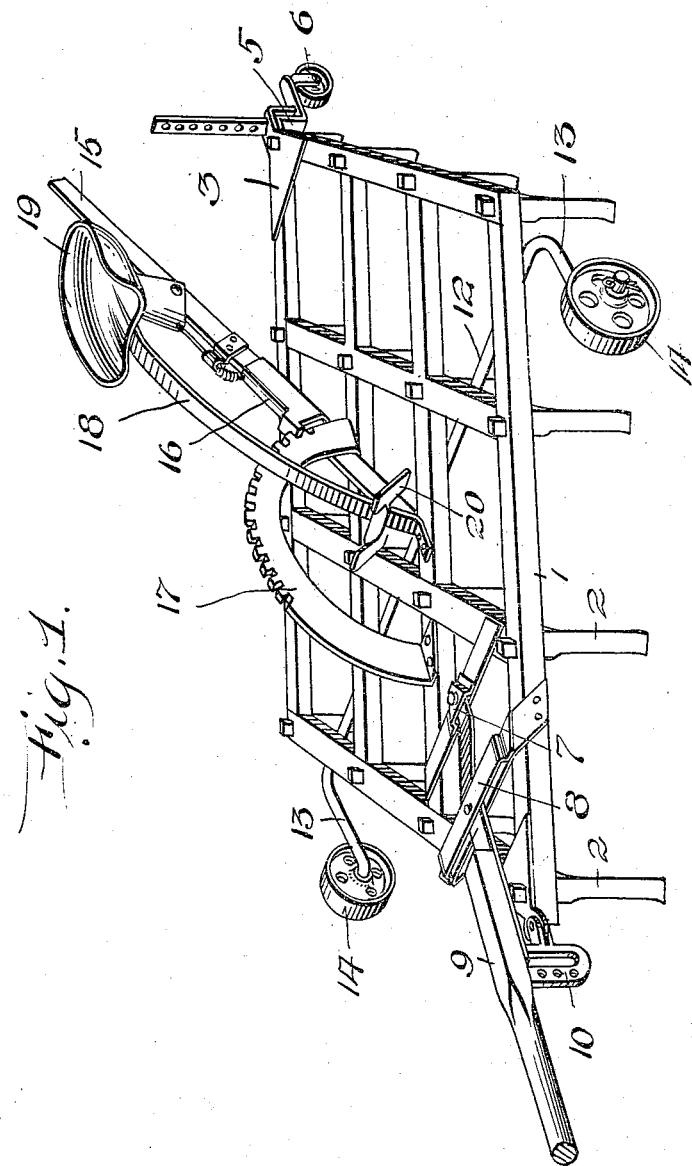
WITNESSES
INVENTOR
T. Kopinski
Att'ys T. KOPINSKI.
HARROW.
APPLICATION FILED JULY 9, 1912.
1,058,067.
Patented Apr. 8, 1913.
2 SHEETS—SHEET 2.
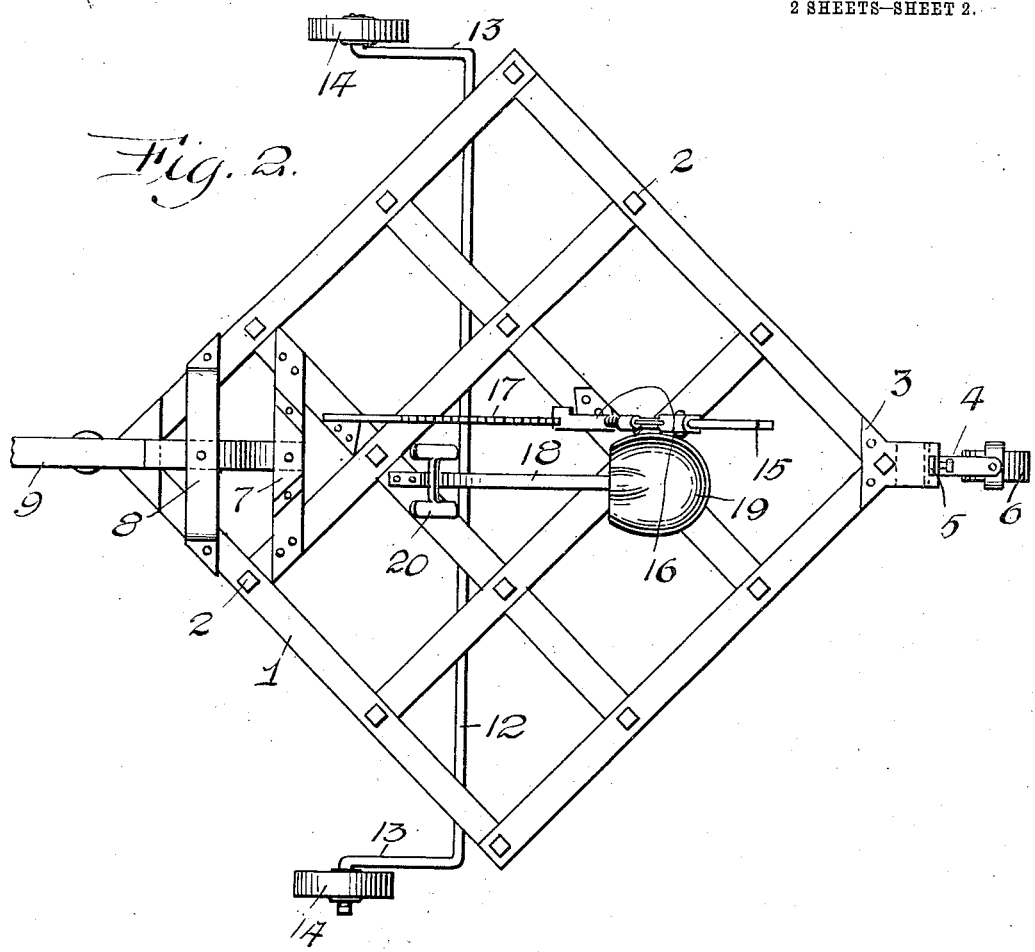
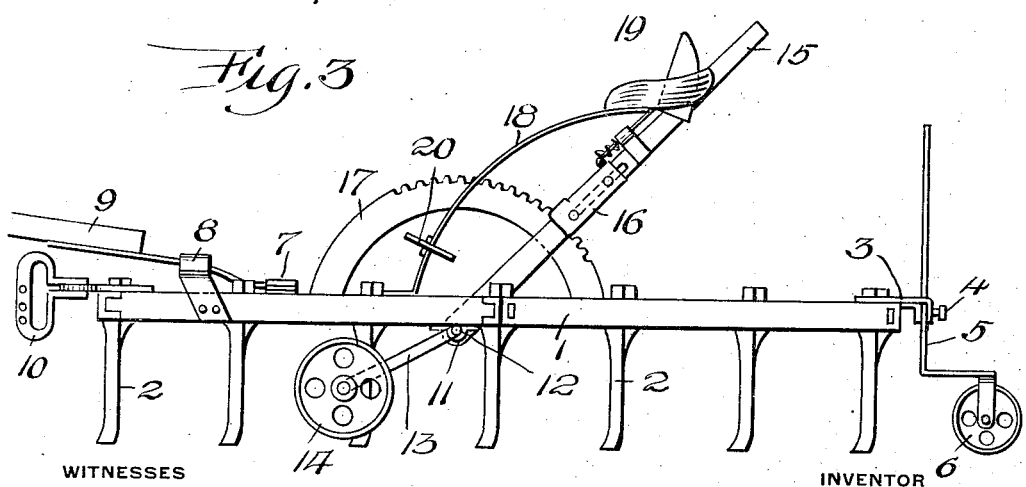
WITNESSES
Samuel Payne
J. P. Appleman
INVENTOR
T. Kopinski
Att'ys.

UNITED STATES PATENT OFFICE.

TOMASZ KOPINSKI, OF ROCHESTER, NEW YORK, ASSIGNOR OF ONE-THIRD TO JOZEF KONIECZNY, OF ROCHESTER, NEW YORK.

HARROW.

1,058,067.  Specification of Letters Patent.  Patented Apr. 8, 1913.

Application filed July 9, 1912. Serial No. 708,397.

*To all whom it may concern:*

Be it known that I, TOMASZ KOPINSKI, a subject of the Emperor of Germany, residing at Rochester, in the county of Monroe and State of New York, have invented certain new and useful Improvements in Harrows, of which the following is a specification, reference being had therein to the accompanying drawing.

This invention relates to harrows, and the primary object of my invention is to furnish an agricultural implement of the above type with a novel adjusting mechanism whereby the body of the harrow can be raised or lowered, particularly when moving onto and off of a field.

A further object of this invention is to provide an implement of the above type that is durable, inexpensive to manufacture, easy to manipulate and highly efficient for the purposes for which it is intended.

With the above and other objects in view, the invention resides in a novel construction, combination and arrangement of parts to be hereinafter specifically described and then claimed.

Reference will now be had to the drawings, wherein like numerals denote corresponding parts throughout the several views in which:—

Figure 1 is a perspective view of the harrow. Fig. 2 is a plan of the same, and Fig. 3 is a side elevation of the harrow.

A harrow in accordance with this invention comprises a rectangular frame 1 composed of bars that are arranged at right angles to each other and at the joints or inner sections of said bars there are depending harrow teeth 2 that are suitably connected to the frame 1. The teeth 2 are adapted to engage the soil and disintegrate or till the soil to that extent that it is in condition for seeding. One corner or angle of the frame 1 forms the rear part of the implement and the opposite corner or angle the front end of the implement. The rear end of the implement has a bracket 3 and adjustably mounted in said bracket by a pin or screw 4 is a truck 5 for a revoluble trailer wheel 6. The forward end of the implement has tongue supports 7 and 8 for a tongue 9, and pivotally connected to the forward end of the implement is a draft appliance 10 of the ordinary and well known type.

The frame 1, intermediate the ends thereof, is provided with transversely alining bearings 11 for a rock shaft 12 that has the ends thereof provided with cranks 13 supporting revoluble wheels 14. Mounted upon the shaft 12 is the lower end of an operating lever 15 and this lever is provided with a conventional form of locking mechanism which is associated with a segment shaped rack 17, carried by the frame 1.

Mounted upon the frame 1, adjacent to the rack 17, is a resilient or spring seat support 18 having a seat 19 and a foot rest 20. An operator seated upon the seat 19 can easily manipulate the lever 15 to raise and lower the wheels 14 relatively to the frame 1, whereby the position of the forwardmost harrow teeth 2 relatively to the soil, can be regulated. It is also possible to elevate the teeth 2 above the soil, whereby the harrow can be readily moved on and off a field.

Wood and metal can be combined to provide a durable harrow and I would have it understood that the same can be made of various sizes.

What I claim is:—

An agricultural implement comprising a frame diamond shape in plan and having its forward corner provided with means for connecting a draft appliance thereto and its rear corner having secured thereto a rearwardly projecting bracket, a truck having a vertically extending portion projecting through said bracket, means carried by the bracket for adjustably connecting said vertically disposed portion thereof, and a trailer wheel carried by said truck.

In testimony whereof I affix my signature in the presence of two witnesses.

TOMASZ KOPINSKI.

Witnesses:
C. E. ZAWADZKI,
JOZEF KONIECZNY.